United States Patent [19]

Emmett

[11] 4,170,926
[45] Oct. 16, 1979

[54] FLUTED CORE DISC BRAKE PISTON

[75] Inventor: John E. Emmett, Farmington, Mich.

[73] Assignee: Hooker Chemicals & Plastics Corp., Niagara Falls, N.Y.

[21] Appl. No.: 871,041

[22] Filed: Jan. 20, 1978

Related U.S. Application Data

[63] Continuation of Ser. No. 667,748, Mar. 17, 1976, abandoned.

[51] Int. Cl.² .................................................. F16J 1/00
[52] U.S. Cl. ........................................ 92/212; 92/239; 92/248; 188/370
[58] Field of Search .................. 92/109, 212, 239, 248, 92/249, 245, 172, 136, 208; 403/359; 188/370; 29/156.5; 264/318; 425/396; 249/175

[56] References Cited

U.S. PATENT DOCUMENTS

| | | | |
|---|---|---|---|
| 2,307,671 | 1/1943 | Dodge | 92/245 |
| 2,752,755 | 7/1956 | Goepfrich | 92/245 X |
| 3,040,712 | 6/1962 | Harrah | 92/248 X |
| 3,091,502 | 5/1963 | Cass | 92/239 |
| 3,212,411 | 10/1965 | Storms | 92/248 |
| 3,497,038 | 2/1970 | Schrader et al. | 188/370 |

OTHER PUBLICATIONS

Autoproducts, "Phenolics Get The Brake They've Been Waiting For," Dec. 1974, pp. 4, 5.

Primary Examiner—Irwin C. Cohen
Attorney, Agent, or Firm—Peter F. Casella; James F. Mudd

[57] ABSTRACT

A plastic disc brake piston is disclosed with a novel fluted inner core design, giving a piston with superior structural strength, crack resistance, and improved heat dissipation when used in disc brake assemblies.

10 Claims, 5 Drawing Figures

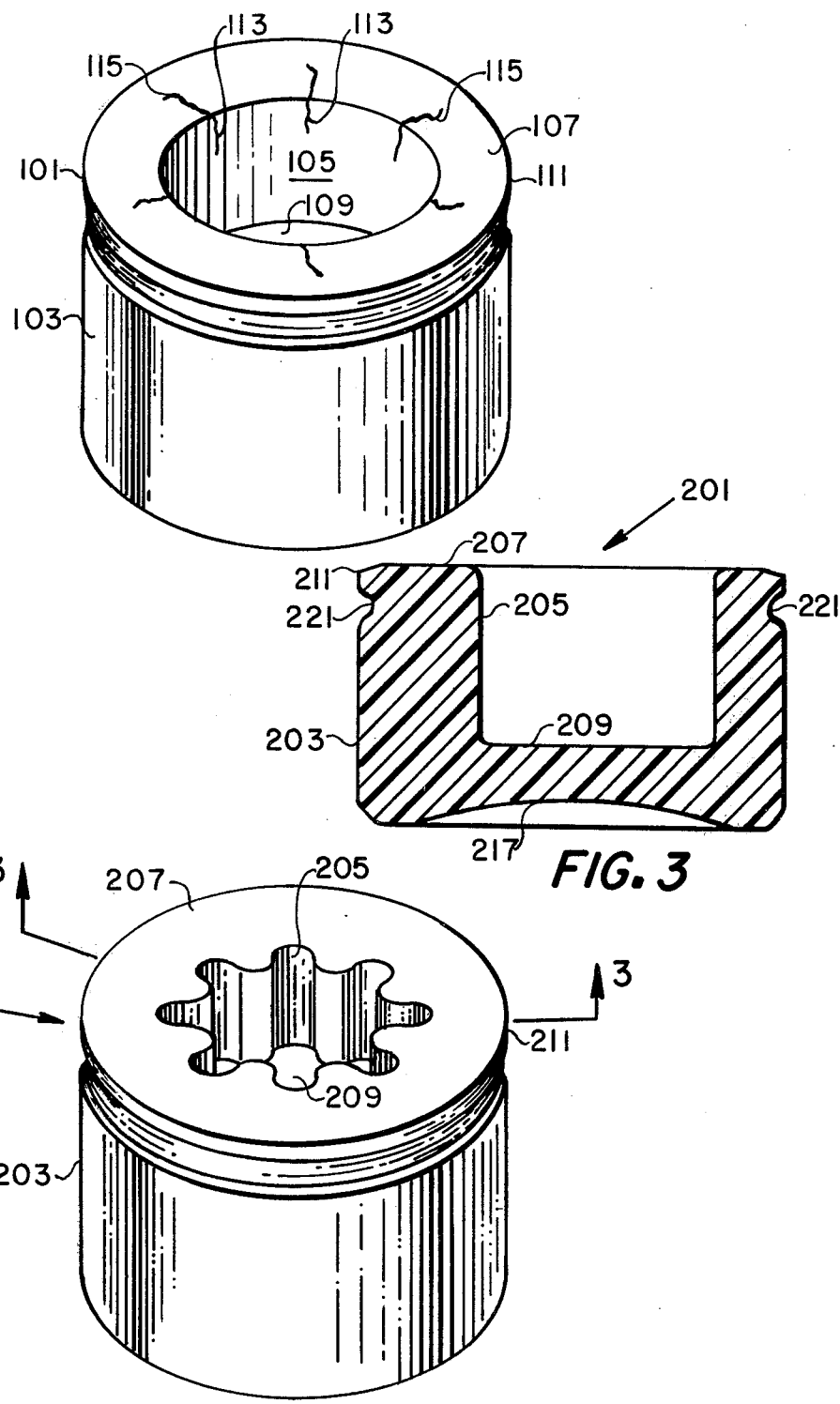

FLUTED CORE DISC BRAKE PISTON

This is a continuation of application Ser. No. 667,748, filed Mar. 17, 1976, and now abandoned.

BACKGROUND OF THE INVENTION

This invention relates to a plastic disc brake piston with a fluted core design for superior structural strength, crack resistance, and improved heat dissipation, without sacrificing contact surface area.

Although the principal area of application of disc brakes is for use in motor vehicle, particularly automotive, braking systems, the present invention can be useful whenever braking force is applied to slow or stop an object in motion, such as an aircraft, a rotor, an auxiliary drive, or other similar devices. Therefore, although the present invention will be described for illustrative purposes in an automotive context, it is not intended in any way to so limit the present invention, and uses of the present invention are contemplated for other purposes than automotive braking systems.

In recent years a high priority has been placed upon achieving significant weight reductions in the design of new automobiles. This objective has been given even greater impetus under the impact of fuel shortages and the continuing need for fuel and energy conservation. Accordingly, considerable developmental work in recent years has directed attention towards materials substitution for various automative parts, with a trend toward use of more non-metal parts having been clearly established. Illustration of the extent to which metal parts have already been replaced by parts made of lighter materials can be found in an article appearing in *Autoproducts,* December 1974, pgs. 4 to 5, where it is stated that the average 1975 model car contains more than 150 pounds of plastic. The particular component with which the present invention contemplates replacing a metal with a plastic part is located within a vehicle braking system, more particularly, within a disc brake caliper assembly.

It has been recognized that for many vehicle applications, a disc type brake system offers considerable advantages over internal expanding brakes. Thus, for example, a disc brake is more readily responsive to the actuation of the master cylinder, provides a firmer engagement of the rotating surface, and requires a smaller stroke of the master cylinder piston than most internal expanding brakes. The disc brake generally comprises a rotating brake disc coupled with the vehicle wheel or axle and has a pair of annular brake faces lying in planes transverse to the axis of rotation of the disc. Flanking the disc and juxtaposed with these annular braking surfaces over only a fraction of this surface are a pair of brake shoes of segmental configuration which engage only limited regions of the braking faces. Such brake shoes are mounted in a yoke which is connected to a stationary portion of the vehicle, e.g. the axle housing or chassis, and are forced by respective wheel brake pistons against the disc. Such pistons are located in wheel brake cylinders formed in the yoke and are connected by hydraulic lines to the master cylinder. In other variants, only a single wheel brake cylinder is provided and either the disc or the yoke is axially shiftable to bring the opposite face of the disc into engagement with a brake shoe fixed on the yoke when the piston forces its brake shoe against the disc. U.S. Pat. No. 3,442,356 to Hahm describes a low-noise hydraulic spot-type disc brake with a piston fitted with a sleeve of low friction, wear and corrosion resistant material, such as stainless steel, having a polished internal surface, of synthetic resin such as polytetrafluoroethylene, or other suitable material. No mention is made in Hahm of use of other than the conventional metal materials for construction of the piston itself.

U.S. Pat. No. 3,599,758 to Bishop shows a disc brake assembly of the sliding caliper type, illustrating the construction of a typical disc brake system and the relationship of the disc brake piston with the disc brake cylinder housing.

Further illustrations of disc brake assemblies employing pistons of conventional construction can be found in Haraikawa, U.S. Pat. No. 3,804,212; in Swift, U.S. Pat. No. 3,361,229; Dowell, U.S. Pat. No. 3,094,193, showing an application of disc brakes to aircraft; Baxendale, U.S. Pat. No. 3,896,907, showing an application to large trucks or tractor-trailer combinations; and Erickson in U.S. Pat. No. 3,115,952, showing a vehicle disc brake and piston assembly.

Conventional disc brake pistons have been manufactured of steel by a cold extruding process or draw forming steel plate, followed by a grinding process and by plating with a layer of chromium to a thickness which will decide the final tolerance. Due to the fact that tolerances necessary are extremely close, the chromium plating process is very deliberate, and production of a considerable amount of scrap is unavoidable. Moreover, chromium-coated steel pistons are subject to corrosion problems which in servicing necessitate buffing the metal with an abrasive and then reinserting the piston. Another problem encountered with plated steel pistons is rapid heat transfer to the hydraulic fluid, the result of high thermal conductivity through the metal. The weight of a steel disc brake piston used on a full-sized automobile can be typically about 790 grams, while the weight of the piston of the present invention, substitutable for such a steel version, is about 350 grams. Weight savings are multiplied by the number of braking units used in a vehicle which may be two units for some models of automobiles, four units for others, and an even greater number for tractor-trailer or aircraft use.

A difficulty which, however, has been encountered with plastic disc brake pistons in the past has developed under conditions of prolonged usage when the part has been exposed to service operation where wide temperature variations and repeated mechanical stresses typically are encountered. When the prior art plastic disc brake piston is exposed to service conditions where wide temperature variations are encountered, small cracks can appear on the pressure bearing face, radiating from the inside wall outward. In FIG. 1 a plastic piston of the type described in *Autoproducts,* December, 1974, demonstrates this condition where the open end of the prior art plastic piston has been exposed to test apparatus temperatures of 500° F.

The cracking, while not detrimental to the function of the piston, has resulted in concern about the merit of a disc brake piston non-metallic material which can compete with the performance and economics of the steel piston it is designed to replace. Such cracking cannot be tolerated in an application demanding a high degree of reliability over a sustained period of operation. A configuration of piston which can minimize or eliminate such cracking prolongs the useful life of disc brake piston assemblies, provides an increased margin for safety in motor vehicle or other applications, and retains all the advantages of plastic disc brake pistons over metal pistons.

Furthermore, a configuration which can minimize or eliminate such cracking will encourage brake engineers to look more favorably to plastic materials which will satisfy the structural and economic needs of disc brake piston designers.

SUMMARY OF THE INVENTION

It has been found that the radial cracking, as illustrated in FIG. 1, of a molded plastic disc brake piston subjected to thermal and mechanical stresses can be minimized by increasing the inside surface area of the plastic piston core, giving not only a unexpectedly high crack resistance to this design of piston, but also high heat dissipation properties. Although a number of geometric patterns are contemplated for the interior surface cross section, it is preferred to utilize a configuration in which the circumference along the outer edge of the cylinder is nearly equal to the perimeter of the inner surface. In this manner, the interior core surface and the outer surface exhibit equal surface expansion stress. Contemplated configurations include a fluted core piston with, for example, rounded edges, a serrated surface with sharp points, square, round or oval shape and other configurations which increase the core surface area. Preferably, however, a configuration with rounded edges is used, and most preferably, one with rounded edges and equal interior and exterior surface areas. Although it is preferred to utilize a piston core configuration in which the core surface area is substantially equal to that of the outside surface area, such a condition is not contemplated as necessary, and configurations with a greater core surface area or a lesser core surface area than that of the outside surface can be used. It is furthermore possible to utilize a fluted core configuration with a reduced wall thickness which gives a piston cross section area yielding a piston with sufficient compressive strength.

Although the preferred embodiment of the fluted core piston is made on a compressive mold using preheated preforms of material, other embodiments can be molded by transfer or injection molding processes.

BRIEF DESCRIPTION OF THE DRAWINGS

FIG. 1 is a perspective view of a prior art plastic disc brake piston, showing cracks which have been found to develop when exposed to high temperatures.

FIG. 2 is a perspective view of the preferred embodiment of the plastic disc brake piston of the present invention.

FIG. 3 is a cross-sectional view along section 3—3 of the piston shown in FIG. 2.

DESCRIPTION OF THE PREFERRED EMBODIMENTS

Figure 4:
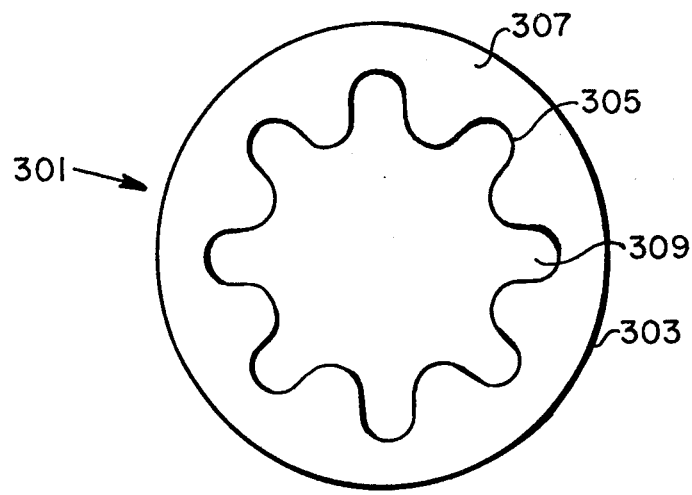
FIG. 4 is a top view of the plastic disc brake piston of the present invention having oval flutings.

FIG. 1 shows a prior art plastic disc brake piston 101 generally, having a substantially cylindrical outer surface 103, a substantially cylindrical core surface 105, the two axes of which surfaces are essentially coincident. Edge surface 107 is essentially perpendicular to the common axis characterizing the outer and inner cylindrical surfaces, although a slight bevel or recess can be present near the extreme outer lip 111 of the piston. Radial cracks are visible on the prior art piston of FIG. 1, appearing within the core 105 at 113 and on the edge surface 107 at 115. Groove 121 accommodates a dust boot (not shown) which can be made of rubber, or other suitable elastomeric substance, for sealing the piston within the vehicle disc brake caliber assembly against road contamination.

FIG. 2 is a perspective view of the fluted core disc brake piston 201 of the present invention, having an outer cylindrical surface 203, and inner fluted core surface 205, an edge surface 207, which is substantially perpendicular to the axis of outer surface 203, and bottom surface 209 of the core which is also substantially perpendicular to the axis of outer cylindrical surface 203. Edge surface 207 can be beveled or recessed somewhat near outer lip 211. The fluting shown in FIG. 2 is equally spaced, although this is not contemplated as a necessary condition for operation of the present invention. The surface area of the internal core surface 205 is substantially equal to the surface area of the outside surface 203 for any given thickness of piston above the inside surface 209. Equal surface areas are not, however, considered a necessity for the proper operation of the invention, and other fluted core surface designs are within the contemplation of the present invention. Groove 221 accommodates a dust boot (not shown), which can be made of rubber or other elastomeric material, for sealing the piston within the vehicle disc brake assembly.

FIG. 3, showing section 3.3 of FIG. 2, depicts piston 201, groove 221, outer cylindrical surface 203, inner fluted core surface 205, bottom surface 209 of the core, and edge surface 207, beveled near outer lip 211. Outer bottom surface 217 is concave or relieved to provide a hydraulic fluid pocket.

FIG. 4 is a top view of fluted core disc brake piston 301, having an outer cylindrical surface 303, an inner fluted core surface 305 with oval shaped flutings, an edge surface 307 which is substantially perpendicular to the axis of outer surface 303, and bottom surface 309 of the core which is also substantially perpendicular to the axis of outer cylindrical surface 303.

Figure 5:
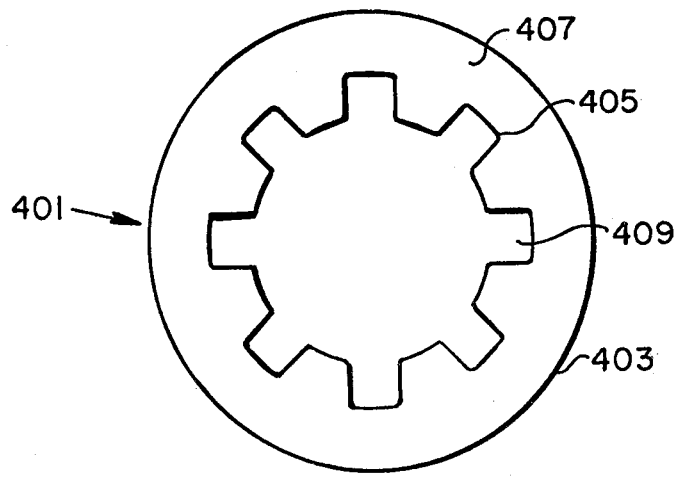
FIG. 5 is a top view of the plastic disc brake piston of the present invention having square flutings.

FIG. 5 is a top view of fluted core disc brake piston 401, having an outer cylindrical surface 403, an inner fluted core surface 405 with square shaped flutings, an edge core surface 407 which is substantially perpendicular to the axis of outer surface 403, and bottom surface 409 of the core which is also substantially perpendicular to the axis of outer cylindrical surface 403.

Compositions which can be used to produce plastic pistons of the present invention include epoxy or phenol-aldehyde resins, preferably phenol-formaldehyde resins, and most preferably novolaks. It is greatly preferred to add a filler material, such as a metal, natural or synthetic mineral fillers, or mixtures thereof. Illustrative of a filler which is preferred is a mixture of glass and natural mineral, although equivalent filler compositions which can be used to impart the necessary properties are also within the scope of the invention contemplated.

It is important that the plastic composition have excellent dimensional stability in order to insure that the piston expands at a rate which is not significantly different from that of the present steel piston. This requires a consideration of physical properties such as the coefficient of linear thermal expansion, impact strength, specific gravity and compressive strength such that these properties assume values which guarantee resistance to failure under service conditions.

The following example serves to illustrate the invention but is not intended to limit it. In the specification and claims, parts and proportions are expressed by weight and temperatures in degrees Fahrenheit unless specified otherwise.

EXAMPLE

A dynamometer apparatus simulating the application of braking force was used to test a standard plastic disc brake piston and a fluted core plastic disc brake piston of the present invention. The test procedure is designed to develop temperatures for evaluating the bonding properties of the disc pads, and results in measurement of temperatures of a brake shoe and of the piston case under conditions of repeated application of braking force. In each case, a piston is tested with an outside diameter of 3.100 inches, manufactured from a phenolic molding compound produced with a 2-stage phenol-formaldehyde resin with glass and natural mineral fillers, having a coefficient of linear thermal expansion of $16 \times 10^{-6}$ per degree Celsius in the range of 30° C.–60° C., a specific gravity of 2.05, an impact strength of 0.38 foot-pounds per square inch, and a compressive strength of 28,000 pounds per square inch.

The fluted piston can be molded in the same way in which the prior art plastic piston is made. The pistons with this unique core design are molded in a single cavity compression mold using pre-heated preformed material. It could be adapted to the present production method which is a 10 station rotary automatic compression molding machine with an extruder feed system utilizing a preplasticizing extruder. The preplasticizing extruder has electrically heated zones preset and controlled from a control panel. The raw material is dropped into the first zone of the preplasticizer extruder, where it is uniformly preheated to a temperature of approximately 240° F. and plasticized as it is hydraulically screw-driven through the two remaining heat zones, and is thereafter passed through the extruder nozzle. As the plasticizer material extrudate leaves the nozzle, it is measured mechanically and cut to a predetermined length. The extrude is delivered to one of ten heated molds or press stations at a temperature of approximately 340° F., located on the outer diameter of the machine.

This press station contains its own control for opening, closing, and compression speed control. The press station is opened, ejecting the part; foreign material is blown off the mold; the extrudate is loaded; and the mold is closed. The cure time of the material is controlled by the speed of operation of the rotating boom. When the mold opens, the molded piston is retained on the upper mold force. Next, ejector pins push the piston off the upper mold force and a blast of air propels the piston out of the molding equipment. The pistons are visually inspected and conveyed to a deflasher, after which they are placed in a gas fired oven where the pistons undergo a post cure at 350° F. for 16 hours. Upon completion of the curing cycle, the pistons are machined and ground to part tolerance.

Testing of a standard cylindrical inner core plastic disc brake piston showed that the piston surface developed temperatures in excess of 800° F. after a 7 cycle test, while the fluted core piston surface recorded temperatures of 650° F. after seven cycles, and did not exceed 800° F. until 10 cycles of test braking.

This comparison demonstrates a pronounced improvement in heat resistance due to the extended heat dissipation of the fluted core design, and represents a substantial improvement in performance.

While this invention has been described with respect to certain embodiments, they are not intended to limit the scope of the invention, but rather to illustrate the invention, and various changes in the form and design are contemplated within the scope of the invention, as indicated elsewhere in the specification.

I claim:

1. In a disc brake caliper assembly comprising a disc brake cylinder housing and a plastic disc brake piston having a cylindrical outer surface and a hollow inner core having an open end and a closed end defining a substantially planar surface, the improvement wherein the piston has a fluted inner core surface extending from said open end to said substantially planar surface which has a cross-section circumference substantially equal to the cross-section circumference of said cylindrical outer surface.

2. The assembly of claim 1 wherein the flutings of said fluted inner core surface are equally spaced.

3. The assembly of claim 1 wherein the flutings of said fluted inner core surface are rounded.

4. The assembly of claim 1 wherein the flutings of said fluted inner core surface are square.

5. The assembly of claim 1 wherein the flutings of said fluted inner core surface are oval.

6. The assembly of claim 3 wherein said flutings are equally spaced.

7. The assembly of claim 1 wherein said plastic comprises a phenol-aldehyde resin.

8. The assembly of claim 7 wherein said resin is a phenol-formaldehyde resin.

9. The assembly of claim 1 wherein said plastic contains a filler substance.

10. The assembly of claim 9 wherein said filler substance is selected from the group consisting of glass, metal, natural mineral fillers, synthetic mineral fillers, and mixtures thereof.

* * * * *